United States Patent [19]

Turner

[11] 3,910,850

[45] Oct. 7, 1975

[54] CONTOURED MONOLITHIC SUBSTRATE

[75] Inventor: Gordon James Turner, Baltimore, Md.

[73] Assignee: W. R. Grace & Co., New York, N.Y.

[22] Filed: Dec. 19, 1973

[21] Appl. No.: 426,060

[52] U.S. Cl. ...... 252/455 R; 252/477 R; 423/213.2; 423/213.5
[51] Int. Cl.² .......................................... B01J 35/02
[58] Field of Search .................. 252/477 R, 455 R; 23/288 F; 423/213.2, 213.5

[56] References Cited
UNITED STATES PATENTS

| | | | |
|---|---|---|---|
| 1,680,807 | 8/1928 | Schultze | 252/477 R |
| 2,408,164 | 9/1946 | Foster | 252/477 R |
| 3,255,123 | 6/1966 | Haensel | 252/477 R |
| 3,755,204 | 8/1973 | Sergeys | 252/477 R |
| 3,790,350 | 2/1974 | Haensel | 252/477 R |

FOREIGN PATENTS OR APPLICATIONS

| | | | |
|---|---|---|---|
| 413,967 | 7/1934 | United Kingdom | 23/288 F |
| 1,211,081 | 3/1960 | France | 23/288 F |

*Primary Examiner*—W. J. Shine
*Attorney, Agent, or Firm*—Joseph P. Nigon

[57] ABSTRACT

Catalytic converter for internal combustion engine exhaust contains a monolithic ceramic support wherein an exhaust-receiving end of the converter includes three-dimensional surface means for distributing the exhaust in portions to holes therethrough to effect substantially uniform contact of catalyst deposited on walls defining the holes with the exhaust.

1 Claim, 14 Drawing Figures

U.S. Patent  Oct. 7, 1975  Sheet 1 of 2  3,910,850
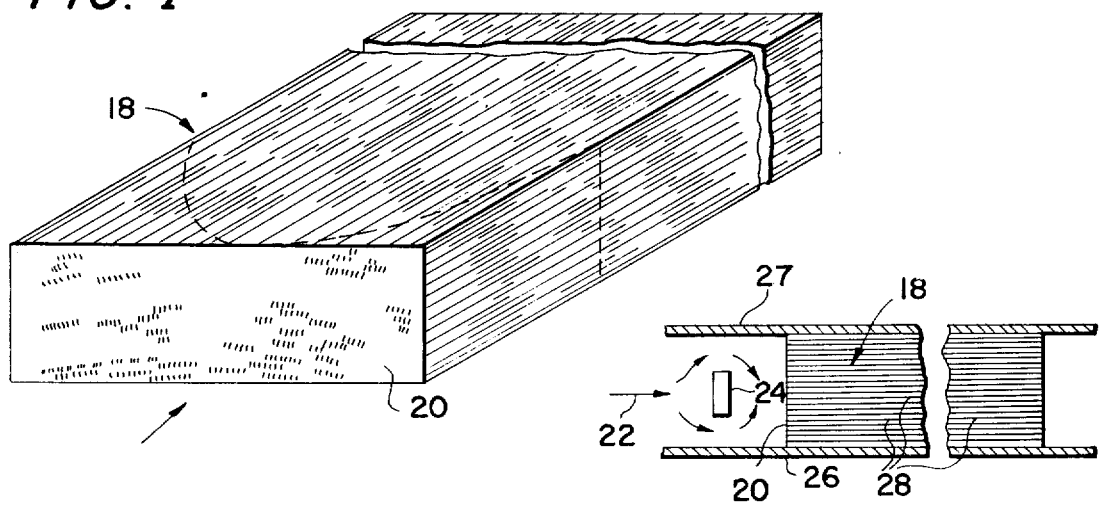
FIG. 1
FIG. 2
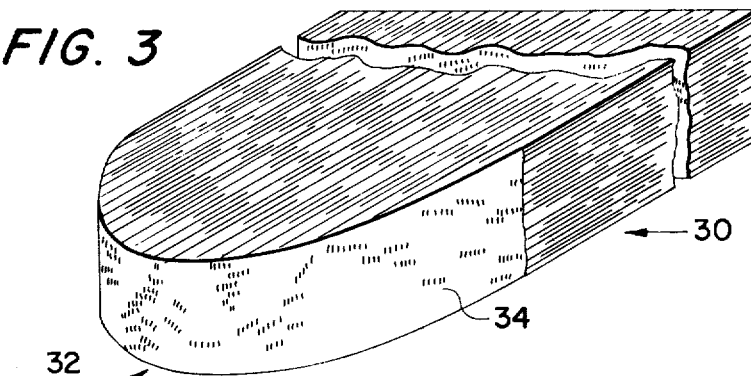
FIG. 3
FIG. 4
FIG. 5
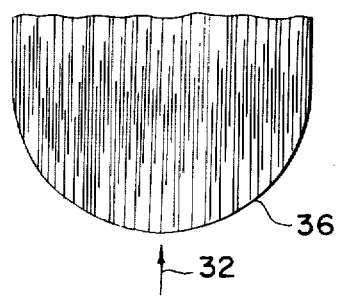
FIG. 6
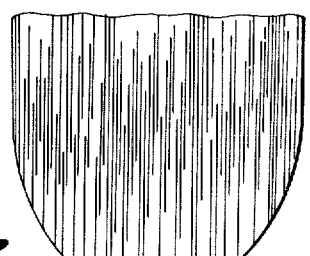
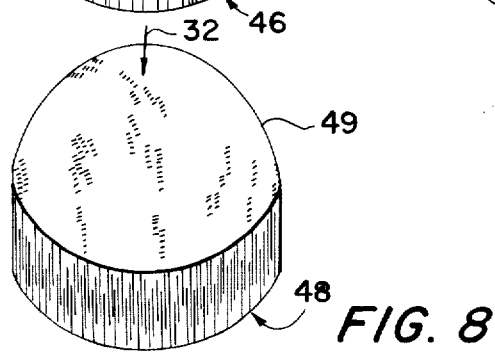
FIG. 7
FIG. 8

CONTOURED MONOLITHIC SUBSTRATE

FIELD OF THE INVENTION

The present invention relates to improved catalytic converters for converting internal combustion engine exhaust to innocuous entities.

BACKGROUND OF THE INVENTION

The composition of the exhaust from internal combustion engines is characterized by the presence of unburned fuel hydrocarbons, both saturated and unsaturated, carbon monoxide, nitrogen oxides and hydrogen. In addition to these noxious entities, the exhaust of internal combustion engines also contains measurable quantities of water vapor. A typical diesel exhaust also contains partial oxidation products such as organic acids, aldehydes and ketones. These materials may be present in some of the exhaust from other types of internal combustion engines but are typical of the exhaust of diesel motors. In addition, the exhaust from internal combustion engines also frequently contains unburned carbonaceous solids.

The problem of purifying exhaust, such as exhaust from automobiles, diesels and the like, is a very difficult and complex matter. It is not unusual for the temperature in catalytic converters to reach 1,600°F. or higher. Thus, exhaust treating catalytic muffler devices are subject to wide fluctuations in temperature over short periods of time. As a result the materials of the construction of the exhaust treating devices are prone to failure due to thermal stress.

The effective frontal area of a catalytic converter device is a major factor in the effectiveness of converting internal combustion engine exhaust gas to innocuous entities. Uniform gas flow through all portions of the device is generally essential in order to maximize overall efficiency of such conversions.

Many prior art catalytic converter devices are cylindrical or generally rectangular in cross section with generally flat two-dimensional contact surfaces perpendicular to the direction of gas flow. As a practical matter, such contour requires the use of canister containers with a variety of complex metal vanes, deflectors, or orifice plates to distribute gas flow to the face of the catalyst substrate.

It has been demonstrated that hot exhaust flowing from tubular manifolds onto catalytic systems supported on monolithic substrates tend to form rings or hot spots of reactions which increase local thermal gradients and lead to increased failure from thermal shock. Variations in flow resistance due to turbulence and inefficient gas distribution across the face of the catalyst support promotes hot spots with resultant undesirable thermal gradients and inefficient catalytic conversion of the noxious exhaust gas. Non-uniform distribution of exhaust flow results in poor utilization of the catalyst and the catalyst becomes spent earlier in the parts of greater flow.

Catalytic converters for land vehicle exhaust which include monolithic substrates having flat contact surfaces, i.e., approach contours, perpendicular to an overall direction of exhaust flow are disclosed in the patent literature. See, for example, U.S. Pat. No. 3,755,204 to Sergeys.

BRIEF DESCRIPTION OF THE INVENTION

It has now been found that a highly efficient monolithic support containing catalytic converter for internal combustion engine exhaust can be prepared wherein an exhaust-receiving end of the converter includes three-dimensional surface means for distributing the exhaust in portions to holes therethrough to effect substantially uniform contact of the exhaust with catalyst deposited on walls defining the holes.

BRIEF DESCRIPTION OF THE DRAWING

In the accompanying drawing:

FIG. 1 is a perspective partial view illustrating a generally flat-face monolithic support component of a prior art catalytic converter for engine exhaust;

FIG. 2 is a side sectional view schematically illustrating a prior art converter system including the prior art monolithic support of FIG. 1 and more clearly illustrating the flat face;

FIG. 3 is a perspective view with part removed illustrating an embodiment monolithic support component of the catalytic converter of the present invention, illustrating three-dimensional surface means on an end thereof as a two-dimensional arcuate surface;

FIG. 4 is a plan view in section of the monolith of FIG. 3, wherein the three-dimensional surface means appears as an arcuate edge;

FIG. 5 is a plan view in section illustrating another embodiment monolithic support of the present invention;

FIG. 6 is a perspective view illustrating another embodiment monolithic support of the present invention, having a two-dimensional arcuate surface at the exhaust receiving end thereof;

FIG. 7 and FIG. 8 are perspective views illustrating yet other embodiment monolithic support components of the present catalytic converters, illustrating the three dimensional surface means on exhaust-receiving ends thereof as three dimensional arcuate contours;

Figure 9:
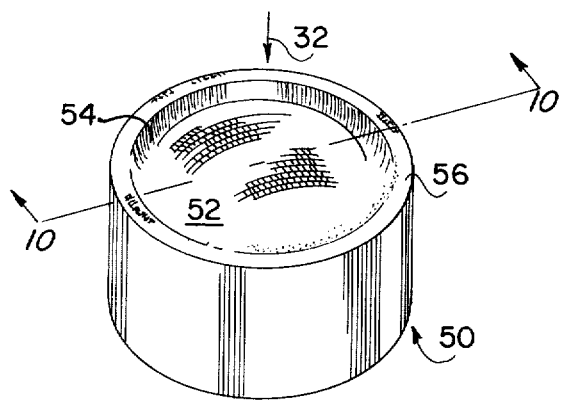
FIG. 9 is a perspective view illustrating an embodiment monolithic support component of the present catalytic converter, having a concavo-convex three dimensional arcuate contour on the end adapted to receive exhaust.

As used herein the term "plane" means a surface the general contour of which is characterized in that a straight line connecting any two points on the contour lies wholly therein. Such surfaces are referred to herein by such words as "plane surfaces," "flat surfaces," "flat face" and words of like import. Conversely, as used herein the term "non-planar surface" and words of like import mean a surface wherein at least one set of two points can be selected such that a line connecting the points will not lie wholly within the general contour of the surface.

As used herein, the term "two-dimensional arcuate surface" means a non planar surface the general contour of which can be generated by revolution of a straight line about an axis. Examples of two dimensional arcuate surfaces include, but are not limited to, the lateral surfaces of such geometric figures as circular cylinders, elliptical cylinders, cones, etc. and arcuate surface portions thereof.

As used herein, the term "three-dimensional arcuate surface" means a non-planar surface the general contour of which can be generated by revolution of an arcuate line about an axis. Examples of three dimensional arcuate surfaces include, but are not limited to, the lateral surfaces of such geometric figures as spheres, paraboloids of revolution, etc. and arcuate surface portions thereof.

As will be readily apparent to those skilled in the art, the term "three dimensional surfaces" as used herein, includes but is not limited to two dimensional arcuate surfaces and three-dimensional arcuate surfaces.

DETAILED DESCRIPTION OF THE INVENTION

The monolithic ceramic support component of the catalytic converter of the present invention is prepared from a plastic composition comprising a finely divided ceramic component, a polyolefin component, and a plasticizer component, each of which is an essential component of the mixture.

The polyolefin component of the plastic composition, which may be a mixture, may be almost any high molecular weight polyolefin having a standard load melt index of substantially 0. As used herein with reference to polyolefins the term "high molecular weight" means a molecular weight of at least 150,000 to 2,000,000. The polyolefin component may be a HMW (i.e., high molecular weight) polyolefin selected from the group consisting of high molecular weight particle-form high density (0.93–0.97) polyethylene, high molecular weight low density polyethylene, high molecular weight polypropylene, and high molecular weight particle form ethylene-butylene copolymer.

A polyolefin preferred herein is commercial particle form high molecular weight polyethylene, having a standard load (2,160 g.) melt index of 0.0, a high load (21,600 g.) melt index of 1.8, a density of 0.95, and a viscosity of 4.0 measured as 0.02 grams of polymer in 100 g. decalin at 130°C. This polymer can be prepared by the method given in U.S. Pat. No. 2,825,721 using an ammonium fluoride treated chromium oxide catalyst.

Suitable blends of HMW polyolefins and LMW (i.e., low molecular weight) polyolefins may be included as the polyolefin component, provided that the average molecular weight is not so low as to result in unacceptably brittle compositions.

The finely divided ceramic component may be of almost any ceramic material which when fired in finely divided form, e.g. powder, fuses to an integral structure in or on which catalyst materials active for converting exhaust can be deposited. Suitable ceramic materials include, for example, alumina, spodumene ($LiO_2.Al_2O_3.4SiO_2$), mullite ($3Al_2O_3.4SiO_2$), zircon magnesia-mullite, alumina, spinel, cordierite ($2MgO.2Al_2O_3.5SiO_2$) and aluminum titanate. Cordierite and aluminum titanate are generally preferred.

The plasticizer component may be almost any of numerous suitable plasticizers, including mixtures thereof. A number of suitable water soluble plasticizers are set forth below:

a. glycol, glycol ethers and esters,
b. glycerin, glycerol monoacetate, etc.
c. diethylene glycol, diethylene glycol ethers and esters, triethylene glycol, etc.
d. polyethylene glycols (molecular weight range 400 to 20,000)
e. propylene glycol, dipropylene glycol
f. polypropylene glycol (molecular weight range 260 to 1,200)
g. trimethylene glycol, tetramethylene glycol, 2, 3-butylene glycol, etc.
h. alkyl phosphates (e.g., triethyl phosphate)
i. water soluble polymeric materials, such as polyvinyl-alcohols, partially hydrolyzed polyvinyl acetate, polyacrylic acid, and polyvinyl pyrrolidone.

Mixtures of water soluble plasticizers and organic solvent soluble plasticizers may be included.

A number of suitable organic solvent soluble plasticizers are set forth below:

a. chlorinated hydrocarbons
b. miscellaneous plasticizers — sulfonamide, coumarone-indene, asphalt, etc.
c. hydrocarbons — paraffin oil, low polymers such as polyisobutylene and polybutadiene.

The plasticizer is preferably selected from the group consisting of mineral oils, diethylene glycol, propylene glycol, dipropylene glycol, glycerin, glycerol monoacetate, trimethylene glycol, tetramethylene glycol, 2, 3-butylene glycol, triethyl phosphate, polyvinyl alcohol, and polyvinyl pyrrolidone.

The components of the composition can be included in the following amounts suitable for providing a workable plastic composition: polyolefin 5–70 percent by volume, plasticizer 15–80 percent by volume, and filler 15–80 percent by volume; or polyolefin 5–70 percent by weight, plasticizer 10–70 percent by weight, and filler 20–90 percent by weight. The preferred ranges are polyolefin 5–50 percent by volume, plasticizer 20–60 percent by volume, and filler 20–50 percent by volume.

The plastic composition may be prepared in any suitable manner, a number of which are disclosed in U.S. Pat. No. 3,755,204. For example, the various essential components, with or without suitable additives, may be pre-mixed at room temperature in a dough mixer. The resulting dough or powder may be further mixed to a substantially uniform mixture using a plastograph.

Conveniently, the monolithic ceramic component of the present catalytic converter may be prepared from the plastic composition as next described. A mixture of the components of the plastic composition is compounded by heating to from about 300°F to about 550°F with working until a uniform composition results. Thereafter the composition is extruded and shaped to form a flat sheet having a series of ribs thereon, as illustrated in FIG. 15 of the drawing by sheet portion 10 having a generally flat undersurface, shown by edge 12 thereof, and opposite thereto a plurality of flat top ribs 14 provided in generally parallel relationship each to others. Extruding and shaping to form the ribbed sheet may be carried out using well known forming techniques.

Conveniently, the plastic mixture may be extruded using an extruder equipped with a sheet-forming die and having a 20:1 length to diameter ratio and a 3:1 compression ratio. The sheet may be extruded at a temperature of from about 300°F to about 500°F in a thickness of from about 10 to about 50 mils and a width of from about 4 to about 36 inches or more. Ribs may be formed by passing the extruded sheet while still hot through the nip of a pair of pinch rolls, one of which is provided with grooves generally corresponding in size and shape to the desired size and shape of the ribs.

Figure 13:
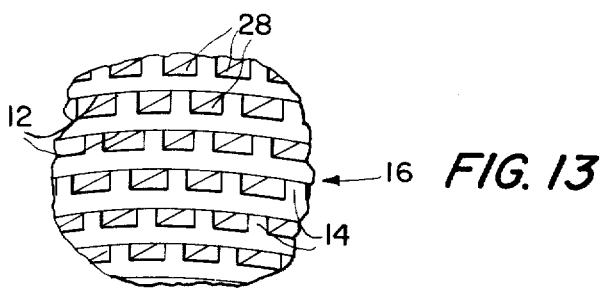
FIG. 13 is a perspective view, partly in section, illustrating in greater detail through holes and walls defining the holes in an embodiment catalytic converter of the present invention.
Figure 14:
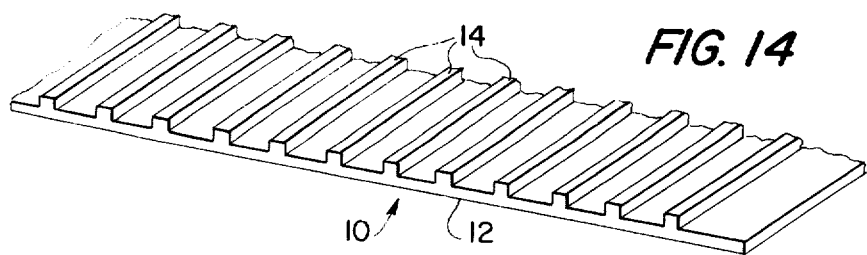
FIG. 14 is a perspective view illustrating part of a rib-bearing ceramic layer from which the present monolithic support component may be prepared.

The ribbed sheet is next formed to a layered structure as by winding or taking up the sheet about a roll such that the ribs are generally parallel to the roll axis with the rib tops in contact with the undersurface of adjacently wound sheet sections. The resulting structure is illustrated in FIG. 13 by radially layered structure 16.

The ribs are heat sealed or bonded to undersurfaces with which rib-top contact is made by heating to a sealeffecting temperature, for example, from about 350°F to about 500°F, and preferably about 400°F. While heat sealing and winding may be performed in any order, conveniently sealing is effected by winding the ribbbed sheet while at sealing temperature.

Next, a monolithic substrate having a desired shape is cut from the bonded radially layered structure and at least a substantial fraction of the plasticizer is extracted. Extraction and cutting may be performed in any sequence. Extraction can be accomplished by any solvent in which the plasticizer is soluble. For example, when using a plasticizer such as mineral oil, hexane is a suitable solvent. When a water soluble plasticizer such as diethylene glycol is used, water is a suitable solvent. Removal of the plasticizer results in formation of a microporous structure.

Extraction provides microporosity to the structure, thereby aiding in increasing catalyst efficiency of catalyst converters including the ultimately prepared monoliths as components thereof.

After cutting and extracting, three-dimensional surface means is provided on an end of the cut and extracted blank. The means and end correspond, respectively, to the means and end of the ultimately prepared monolithic support component.

Thereafter, the blank having three dimensional surface means generally at an end thereof is heated to from about 240°C to about 700°C to decompose and remove the polyolefin, followed by sintering at a temperature effective therefor, e.g. from about 1,300°C to about 1,600°C, for from about 2 to about 6 hours to fuse the finely divided ceramic component to a mature rigid microporous monolithic ceramic structure having holes therethrough. After cooling, preferably to room temperature (i.e., about 25°C) which may require up to about 4 hours, the monolithic support is recovered.

Desirably, the ratio of the surface area of the three-dimensional surface means is from about 1.5:1 to about 2.5:1 relative to the area of a section of the monolith taken normal to its axis and adjacent to the surface means.

Any suitable catalyst or mixture thereof active for converting internal combustion engine exhaust may be deposited in or on the surfaces of the monolithic support using any suitable deposition technique therefor. Numerous such catalysts and deposition methods are well known in the art. See, for example, U.S. Pat. Nos. 3,288,558; 3,295,918; 3,304,150; 3,322,491; 3,338,666; 3,346,328; 3,455,843; 3,470,105; and 3,755,204.

Practice of the present invention will become more fully apparent by having reference to the following description taken with the accompanying drawing wherein like numerals refer to similar elements throughout. While the following description is given principally by way of illustrating the monolithic support of this invention it is understood that the present catalytic converter is a composite thereof with suitable catalytically active materials. Typically, such composites have substantially the same shape and configuration as the monolithic support component thereof.

In FIG. 1 there is shown monolithic ceramic support 18 generally rectangular in sides, ends and cross section. The support is typical of many prior art catalytic converters in that exhaust receiving face 20 thereof is a generally planar surface. When such converters are included in converter systems of the prior art, the generally flat face is typically oriented perpendicular to the overall flow direction of exhaust to be treated. Such a system is illustrated schematically in section in FIG. 2 by the arrangement of monolith support 18 encased by exhaust conduit walls 26 and 27 with the overall exhaust flow direction indicated by arrow 22 pointing perpendicularly toward face 20 and in the longitudinal direction of holes 28 provided through the monolith. Channels 28 are shown in greater detail in FIG. 13 which shows, in enlarged partial perspective view, the structure of the monolith as results by using a preparation method substantially as set forth above.

Also shown in FIG. 2 is means 24 schematically illustrating the prior art means such as complex arrangements of vanes, baffles, orifice plates or like means typically required heretofore in attempts to uniformly distribute the exhaust to the various through holes in efforts to effect uniform contact of the exhaust with catalyst deposited on the hole-defining walls. Such attempts have been generally less that satisfactory and at the same time complex in construction and installation with resulting inefficiencies in use.

Referring again to the present invention, FIG. 3 illustrates an embodiment monolith 30 thereof, generally rectangular in sections taken normal to the overall flow direction, indicated by arrow 32, and characterized by three-dimensional surface means 34 provided on an end adapted to receive exhaust to be converted by active catalyst material deposited in or on the walls defining through holes 28 (shown in greater detail in FIG. 13.)

Three-dimensional surface means 34 is a two-dimensional arcuate surface which may be a partial lateral surface of a circular cylinder as illustrated by the top section view in FIG. 4 by generally semicircular surface edge 36 or a partial lateral surface of a generally parabolic cylinder as illustrated by generally parabolic surface edge 38 in the top section view of FIG. 5.

The three dimensional surface means may be provided conveniently by cutting structures in desired configurations directly from a roll prepared as set forth in the above description or by further cutting blanks of suitable size cut from the roll. As a general preference, suitable blanks are first cut followed by a finishing step which may be machining, milling or the like to provide the three-dimensional surface means.

In another embodiment of the present invention, as illustrated in perspective view in FIG. 6, a monolith having a generally rectangular cross section with a pair of arcuate opposite sides (of which arcuate side 42 is shown) is provided with two-dimensional arcuate surface 40 at the exhaust receiving end thereof. Surface 40 may be generally elliptical in sections taken generally parallel to non-arcuate side 44 of the monolith.

FIG. 7, FIG. 8 and FIG. 9 illustrate other aspects of the present invention wherein embodiment monoliths 46, 48 and 50 are generally cylindrical in the largest sections taken normal to the direction of ordinary overall exhaust flow with three-dimensional arcuate surface means provided on ends thereof adapted to receive exhaust to be treated. Thus it is seen that generally cylindrical monolithic support 46 is provided with generally hemispherical surface 47 and generally cylindrical support 48 is provided with generally arcuate dome surface 49 which may be a paraboloid of revolution as shown.

Figure 10:
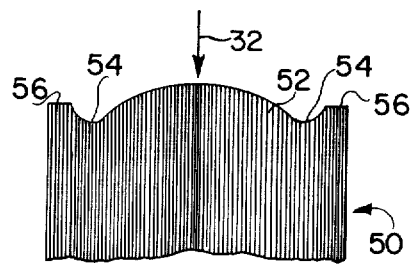
FIG. 10 is a partial view, in section, taken along line 10—10 of FIG. 9.

Embodiment monolithic support 50 (FIG. 9 and FIG. 10) is provided with convex three dimensional arcuate surface 52 generally medial of an end thereof, and preferably concentric about the support axis, and with recessed concave three dimensional arcuate surface 54 about the periphery of the convex surface. The recessed surface may taper arcuately to the side of the support or be connected thereto by way of thin annular planar surface 56 as illustrated.

Figure 11:
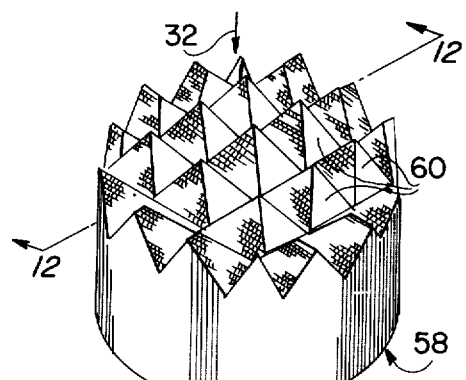
FIG. 11 is a perspective view illustrating an embodiment monolithic support component of the present catalytic converter, having a serrated contour on the exhaust-receiving end.
Figure 12:
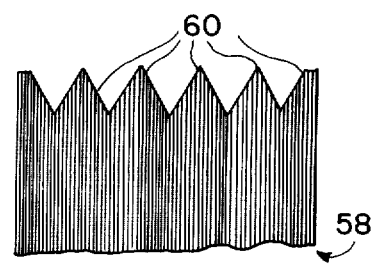
FIG. 12 is a partial view, in section, taken along line 12—12 of FIG. 11.

In another aspect of the present invention, illustrated in FIG. 11 and FIG. 12, embodiment monolith 58 is provided with a plurality of pyramidal protuberances 60 defining a serrated surface at an end thereof.

The various three dimensional surfaces means provided on ends of the monoliths of the present invention are effective for distributing internal combustion exhaust, under a wide range of conditions, to the holes provided through the monolith, preferably in generally parallel relationship each to others, to effect substantially uniform contact of active conversion catalyst materials deposited in or on the surfaces defining the holes. Not only is catalyst efficiency promoted by the present contoured monoliths, but such promotion is obtained without unacceptable increase in pressure drop of exhaust passed through the present catalytic converters. The highly efficient converters of the present invention are especially attractive for improving performance of catalytic converters including sections taken from the above described rolls of ribbed sheets at locations sufficiently remote to the roll axis as to have radially spaced ribbed layers which may have an average radius of from about 1 to about 3 feet.

The present monolithic ceramic support may suitably be characterized by substantially uniform ribbed layers wherein:

a. the distance from the under-surface of a layer to the top of the ribs thereof is from about 10 to about 100 mils, b. the thickness of the layer in the regions between the ribs is from about 5 to about 20 mils, c. the distance between adjacent ribs is from about 20 to about 100 mils, d. in sections taken perpendicular to the longitudinal extent of the through holes, the area of the through holes is from about 30 to about 90 percent of the overall area of the monolithic ceramic support, and the ribs are generally rectangular in such section;

e. the average pore diameter is from about 1 to about 10 microns, and f. the pore volume is from about 20 to about 60 percent of the overall volume (i.e. including pore volume) of the ribbed layers.

The invention is further illustrated by the following specific, but non-limiting, examples.

EXAMPLE 1

A composition was prepared by admixing 8.6 grams of HMW particle form polyethylene, 76.8 grams of cordierite and 28.8 grams of a mineral oil containing approximately 80% saturates. The components were mixed in a commercially available Brabender Plastograph heated to 170°C. The composition was extruded and pressed in 12 mil sheets in a hydraulic press with 20 tons force.

Ribs about 20 mils wide, 30 mils high and spaced ⅛ inch apart were provided on the sheet using a pair of pinch rolls, one of which was provided with grooves corresponding to the ribs. The ribbed sheet was rolled up about a mandrel with the ribs protruding from the top of the layered structure having holes therethrough as shown in FIG. 13 and was heatsealed by heating to a temperature of about 400°F. The heatsealed structure was then cooled and immersed in hexane for 30 minutes to extract substantially all the mineral oil.

A cylindrical structure about 4 inches in diameter with the holes extending in generally parallel relationship to the axis was cut from the extracted roll. A three-dimensional arcuate surface substantially as illustrated in FIG. 7 was provided on an end of the cylindrical structure using well known machining procedures.

known procedures. The resulting contoured structure was dried and heated in a non-oxidizing atmosphere, first to about 250°C (over a period of 3 hours). When degradation began as evidenced by the brown color of the structure, the temperature was slowly increased and about 2 hours later at about 700°C the structure turned white indicating that removal of the polyethylene was complete. The temperature was slowly increased for about 2 hours to about 1,360°C–1,400°C, which temperature was maintained for about 2 hours to sinter the remaining ceramic powder. The structure was cooled to about 25°C over a period of about 4 hours.

EXAMPLE 2

The procedure of Example 1 was repeated except that aluminum titanate was substituted for the cordierite and a three dimensional arcuate surface substantially as illustrated in FIG. 9 was provided on an end of the cylinder.

EXAMPLE 3

The procedure of Example 1 was again repeated except that a three dimensional surface substantially as illustrated in FIG. 11 was provided on an end of the cylinder.

EXAMPLE 4

The procedure of Example 1 was again repeated except that a generally rectangular structure having a pair of arcuate sides was cut from the rolled up structure and a two-dimensional arcuate surface was thereafter provided thereon, resulting in a monolith substantially as illustrated in FIG. 6.

It is to be understood that the foregoing detailed description is given merely by way of illustration and that numerous modifications may be made therein without departing from the spirit or scope of the present invention.

What is claimed is:

1. A catalytic converter for converting internal combustion engine exhaust gas components to innocuous entities which comprises a monolithic ceramic support having internal surfaces defining through holes adapted to pass said exhaust through said support, said internal surfaces having substantially uniformly deposited thereon an active catalyst for converting said exhaust to innocuous entities, said support having an end adapted to receive said exhaust and including three dimensional surface means at said end for distributing said exhaust in portions to said holes to effect substantially uniform contact of said deposited catalyst with said exhaust, said surface means defining at least a substantial part of said receiving end, said support having been prepared by a process consisting essentially of a. preparing a mixture containing 20–50 percent by volume of a filler consisting of finely divided ceramic material selected from group consisting of alumina, spodumene, mullite, zircon magnesia mullite, spinel cordierite, and aluminum titanate, 5–50 percent by volume of a polyolefin having a molecular weight of about 150,000 to 2,000,000 and 20–60 percent by volume of a plasticizer selected from group consisting of glycol, glycerin, diethylene glycol, polyethylene glycol, polypropylene glycol, trimethylene glycol, alkyl phosphate, polyvinyl alcohol, partially hydrolyzed polyvinyl acetate, polyacrylic acid, and polyvinyl pyrrolidone, b. compounding the mixture by heating to about 300°–550°F. with working to prepare a uniform mix, c. extruding the mix to form a sheet and providing ribs thereon, d. heating the ribbed sheet to about 350°–550°F. as measured on at least one of the sheet undersurfaces and the rib tops and winding the sheet about a mandrel to form a bonded structure, e. cutting from the bonded structure a blank having a shape generally corresponding to the desired shape of the monolithic support and extracting the plasticizer, f. providing three-dimensional hemispherical or parabolic cylindrical surface means on an end of the blank, said blank means and end corresponding respectively to said means and end of said support, g. heating the blank having three dimensional surface means thereon to about 240°–700°C. to decompose and remove the polyolefin and sintering to a temperature of about 1,300°–1,600°C. for about 2–6 hours, h. depositing a catalyst on the porous ceramic structure by contacting said structure with solutions of soluble salts of metals exhibiting catalytic activity for converting engine exhaust gases and heating to convert the metals to the active form, i. cooling and recovering the catalytic converter.

* * * * *